United States Patent [19]

Rivera et al.

[11] Patent Number: 4,876,123

[45] Date of Patent: Oct. 24, 1989

[54] TAMPER INDICATING TAPE AND DELAMINATING FILM THEREFORE

[75] Inventors: Raymond R. Rivera, Cottage Grove; Stephen B. VanVleet, Woodbury; Shari J. Wilson, Minneapolis, all of Minn.

[73] Assignee: Minnesota Mining and Manufacturing Company, St. Paul, Minn.

[21] Appl. No.: 212,412

[22] Filed: Jun. 27, 1988

[51] Int. Cl.⁴ .............................................. B32B 7/10
[52] U.S. Cl. .................................. 428/34.2; 156/344; 206/631; 206/807; 229/102; 428/343; 428/513; 428/916
[58] Field of Search ............... 156/344; 206/631, 807; 229/102; 283/81; 428/34.2, 40, 187, 343, 513, 916

[56] References Cited

U.S. PATENT DOCUMENTS

| | | | |
|---|---|---|---|
| 4,000,824 | 1/1977 | Han | 215/232 |
| 4,398,985 | 8/1983 | Eagon | 156/344 X |
| 4,545,832 | 10/1985 | Hoffmann | 156/86 |
| 4,557,505 | 12/1985 | Schaefer et al. | 428/40 X |
| 4,630,891 | 12/1986 | Li | 350/105 |
| 4,652,473 | 3/1987 | Han | 428/40 X |
| 4,759,816 | 7/1988 | Kasper et al. | 156/344 X |

Primary Examiner—Henry F. Epstein
Attorney, Agent, or Firm—Donald M. Sell; Walter N. Kirn; David L. Weinstein

[57] ABSTRACT

A tamper indicating film and tape for use with a package. The tape includes a delaminating film including pahse separated polymers. Indicia are applied to opposing major surfaces of the film indicative of different conditions of the tape. The film is adhesively applied to secure container parts together and enclose an opening in the container. When applied, only one of the indicia are perceptible. When the film is internally delaminated, obscuring one set of indicia and rendering the other set of indicia perceptible.

19 Claims, 3 Drawing Sheets

TAMPER INDICATING TAPE AND DELAMINATING FILM THEREFORE

TECHNICAL FIELD

The present invention relates to delaminating film and a tamper indicating tape made from same for use with a package to indicate opening of the package.

BACKGROUND ART

U.S. Pat. No. 4,652,473 discloses a pressure-sensitive adhesive tape comprising a backing having two separate layers that delaminates. The outer layer has sufficiently high tensile strength to maintain its integrity when removed from the tape and the inner layer adjacent the adhesive is thin and deformable, so that the outer layer can not be removed from the inner layer without disrupting the adhesive bond of the inner layer to the pressure sensitive adhesive, thus providing tamper indication.

U.S. Pat. No. 4,630,891 discloses a tamper resistant security film comprising a monolayer of transparent microspheres supported in a thin layer of binder material. A layer of pressure-sensitive adhesive is coated onto the binder material and at least one patterned layer having differential adhesion to the pressure-sensitive adhesive layer and the binder layer such that upon attempted removal of the film from a substrate at elevated temperature, the film splits, with part of the film remaining on the substrate and part being removed, thus providing tamper indication.

Japanese Patent Applications Publication No. 81JP-06167-8&9 (J57176125A & J57176126A) disclose the extrusion and lamination or coextrusion of a rollable and stretchable thermoplastic resin with a ductile and stretchable thermoplastic resin. The composite is then drawn or stretched monoaxially or biaxially to provide a film which can be delaminated to provide very thin layers of the respective component resin films.

Delaminating films, such as described in the above references include two or more layers of polymeric materials, bonded together either by heat lamination, coextrusion or by means of an adhesive layer. Delamination for these composite films is the separation of the various layers from each other to provide tamper indication. However, the lamination or coextrusion of multiple polymeric layers increases the material expense of the film and tape and requires complex manufacturing techniques.

DISCLOSURE OF THE INVENTION

The present invention provides, in part, a light transmissive film derived from a composition comprising 50 to 85 parts by weight of a first copolymer comprising at least one moiety derived from at least one olefinic monomeric unit and 50 to 15 parts by weight of a second copolymer comprising at least one moeity derived from at least one vinyl alcohol monomeric unit and said second copolymer being sufficiently incompatible with said first copolymer such that two phases are formed within said film, one of said phases being continuous.

The present invention further provides a tamper indicating tape for securing a first container part to a second container part to enclose an opening in the container. The tamper indicating tape includes a light transmissive monolayer film having opposing first and second major surfaces constructed as described above.

The tamper indicating tape also includes first colored indicia printed on the first major surface of the film and second colored indicia printed on the second major surface of said film. The first and second indicia have contrasting colors. Adhesive means are provided for adhering the film to the first and the second container parts with a bond strength greater than the delamination force of the film. The adhesive means is coated on said first major surface of said film opposite the second indicia with a color substantially identical with the color of the second indicia so that the second indicia are obscured when viewed against the adhesive means through the second major surface of the film.

When the film delaminates, such as if the tape is attempted to be removed from the container, it becomes opaque so that the first indicia are obscured when viewed through the delaminated film, but the second indicia are perceptible over the delaminated opaque film to indicate separation of the first and second container parts.

Thus a delaminating film and a tamper indicating tape made therefrom are provided that are effective, easy to use and inexpensive to construct.

BRIEF DESCRIPTION OF DRAWING

The present invention will be further described with reference to the accompanying drawing wherein like reference numerals refer to like parts in the several views, and wherein.

DETAILED DESCRIPTION

Figure 1A:
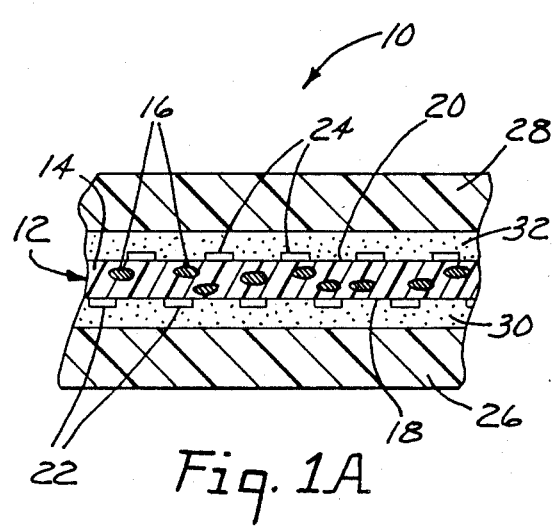
FIG. 1A is a cross sectional view of a tamper indicating tape constructed according to the present invention.

Referring now to the drawing, there is shown in FIGS. 1A, 1B, 2A, 2B, 3A and 3B a tamper indicating tape according to the present invention generally designated by the reference numeral 10. Tape 10 includes a light transmissive film 12. Film 12 includes a first major surface 18 and a second major surface 20. Film 12 is constructed so that the film delaminates internally (i.e. between the first and second major surfaces) when a predetermined level of peel force is applied to the film. Film 12 is derived from a composition comprising 50 to 85 parts by weight of a first copolymer comprising at least one moiety derived from at least one olefinic monomeric unit and 50 to 15 parts by weight of a second copolymer comprising at least one moeity derived from at least one vinyl alcohol monomeric unit.

In one embodiment of the invention, the first copolymer includes from 0 to 15 parts by weight of monomeric units from a polar copolymerizable monomer substantially free of hydroxy (—OH) groups such as is listed in the following group: acrylic acid, acrylonitrile, bicyclo [2,2,1] hept-2-ene, bis (β-chloroethyl) vinylphosphonate, carbon monoxide, diethyl fumarate, diethyl maleate, ethyl acrylate, methacrylic acid, N-methyl-N-vinylacetamide, styrene, vinyl acetate, vinyl chloride, and vinyl fluoride. Preferably, the polar copolymerizing monomer includes moieties derived from one of the following monomeric units: acrylic acid, methacrylic acid and vinyl acetate.

In one preferred embodiment, the first copolymer comprises at least 90 parts by weight (pbw) olefinic monomeric units having between 2 and 4 carbon atoms and in the most preferred embodiment, the first polymer comprises about 97 pbw propylene monomeric units and from about 2.2 pbw to about 2.7 pbw ethylene monomeric units.

In one preferred embodiment of the invention, the second copolymer is a copolymer comprising hydrolyzed ethylene vinyl acetate monomeric units, and in the most preferred embodiment of the invention, the second copolymer is a copolymer comprising ethylene vinyl alcohol monomeric units.

Figure 3A:
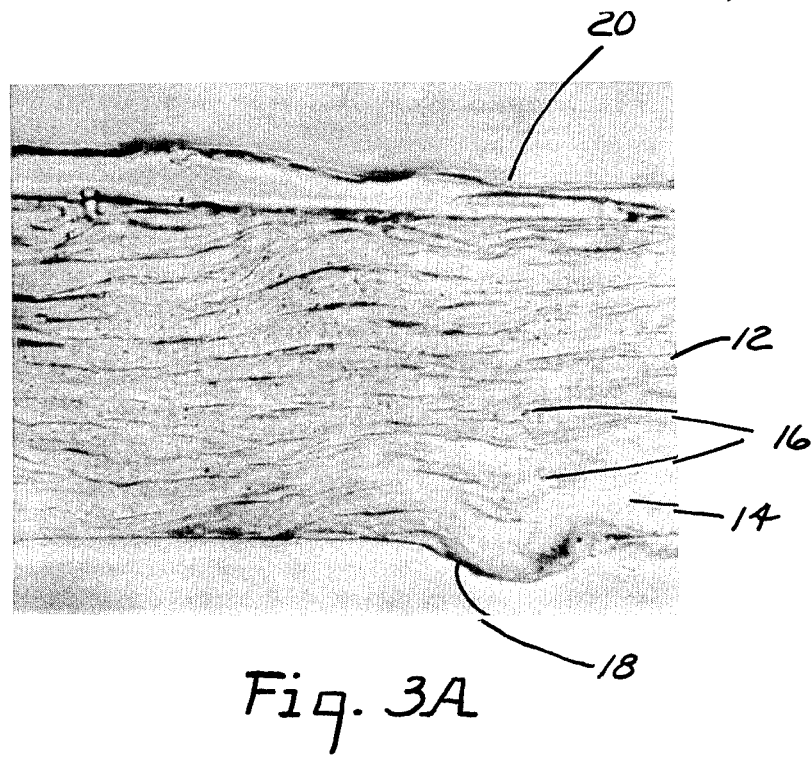
FIG. 3A is a photomicrograph at 610× magnification of a longitudinal cross sectional view of a film for use in a tamper indicating tape constructed according to the present invention.
Figure 3B:
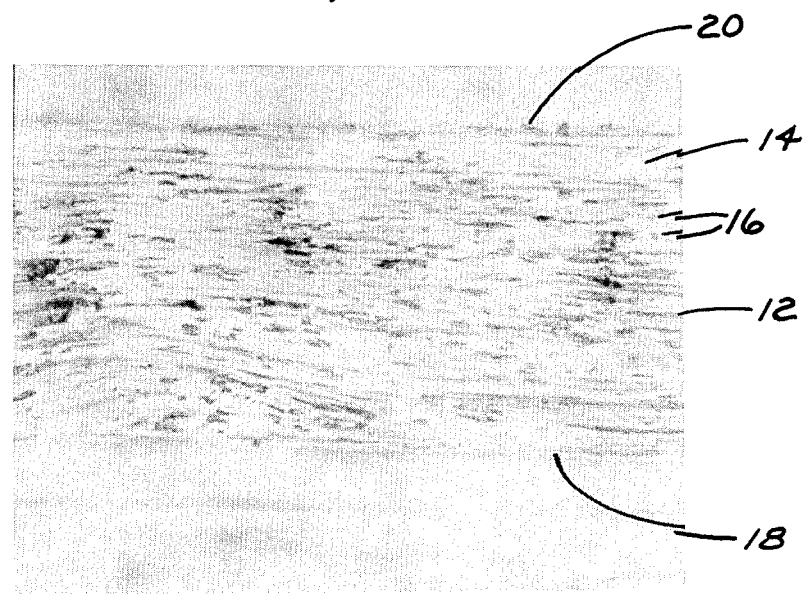
FIG. 3B is a photomicrograph at 610× magnification of a transverse cross sectional view of the film of FIG. 3A.

As is shown particularly in FIGS. 3A and 3B, the second copolymer is sufficiently incompatible with the first copolymer to form two phases within the film. One of said phases 14 is continuous, preferably the phase formed by the first copolymer. The second phase 16, preferably that formed by the second copolymer, forms a multiplicity of inclusions 16 in the film, typically ellipsoidal in shape.

In the most preferred embodiment of the invention described above, shown in FIGS. 3A and 3B, the film comprises about 75% of the first copolymer and about 25% of the second copolymer. The first copolymer comprises about 97 pbw propylene monomeric units and from about 2.2 pbw to about 2.7 pbw ethylene monomeric units. The second copolymer is ethylene vinyl alcohol. The ellipsoidal inclusions 16 formed by the second copolymer have been measured and found to have diameters ranging from approximately 0.8 to 3.3 microns and lengths ranging from approximately 1.6 to 13.1 microns. While not wishing to be bound by any theory, it is believed that the inclusions formed by the second copolymer provide a pattern of weaknesses within the continuous phase of the first copolymer. Thus, the delamination force of the film 12 is predetermined at a desired level depending on the materials selected and their relative ratios. If the second polymer provides more than 50% pbw of the film, the second copolymer begins to form a continuous phase and the film no longer delaminates.

Films produced according to the present invention have unexpectedly high light transmissivity levels and low haze, even though the phase separated morphology due to the incompatibility of the first and second copolymers would be expected to form opaque films. It is believed that the relative size of the inclusions and the closeness of the indices of refractions of the components of the film are such that film has good light transmissive properties.

The film of this invention may be produced by any suitable film generating process, but is preferably produced by dry blending the first and second polymers together, air drying the blend at 200° F. for 48 hours, then extruding the blend onto a driven chilled roll. Preferably, the film is at least 0.003 inches in thickness.

At thicknesses less than 0.003 inches, voids form on the surfaces of the film.

First colored indicia 22 are printed on first major surface 18 and second colored indicia 24 are printed on the second major surface 20 of the film. As is shown particularly in FIGS. 2A and 2B, first indicia 22 indicates one condition of the tape, and second indicia 24 indicates another condition of the tape of this invention. First indicia 22 and second indicia 24 have contrasting colors. For instance, first indicia 22 may be colored blue with second indicia 24 colored red.

Figure 1B:
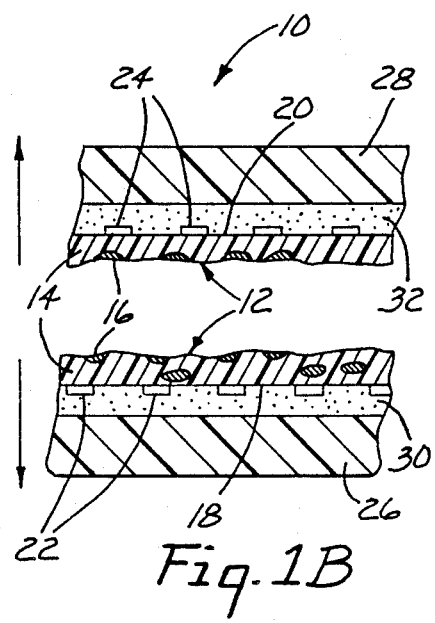
FIG. 1B is a cross sectional view of the tamper indicating tape of FIG. 1A with the film delaminated.

Means are provided to adhere the film to a first container part 26 and a second container part 28 shown particularly in FIGS. 1A and 1B. Although not shown, the first and the second container parts, when secured together, enclose an opening in a container. The adhesive means includes first layer of adhesive 30 coated on first major surface 18 of the film opposite the second indicia 24, and second layer of adhesive 32 coated on second major surface 20 of the film. Although any suitable adhesive may be used, such as a heat activated adhesive or a pressure sensitive adhesive, in the preferred embodiment of the invention, the first and second layers of adhesives are pressure sensitive adhesives such as resin tackified synthetic rubber adhesives, and in particular styrene-butadiene rubber, styrene-isoprene-styrene and styrene-butadiene-styrene rubber; and acrylic adhesives and in particular isoctylacrylate-acrylic acid; and tackified natural rubber adhesives. For instance, the pressure sensitive adhesive provided with tape number 373 marketed by the Minnesota Mining and Manufacturing Co. of St. Paul, Minn. 55133 has been found suitable for use in the tamper indicating tape of this invention.

Figure 2A:
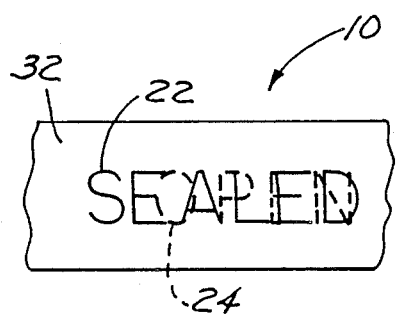
FIG. 2A is a top view of a tamper indicating tape according to this invention.

First layer of adhesive 30 bonds to film 12 and to first container part 26 with a bond strength that is greater than the delamination force of the film. Second layer of adhesive 32 bonds to the film 12 and the second container part 28 with a bond strength that is also greater than the delamination force of the film. One of the layers of adhesive may be covered by a removable liner, such as a silicone release liner (not shown) prior to application on first and second container parts 26 and 28. First layer of adhesive 30 is preferably colord with a color substantially identical to the color of second indicia 24 so that the second indicia are obscured against the first layer of adhesive when viewed through second major surface 20 of film 12. Second layer of adhesive 32 is light transmissive and preferably colorless so that first indicia 22 are readily perceptible through film 12 and the second layer of adhesive, as shown in FIG. 2A.

Figure 2B:
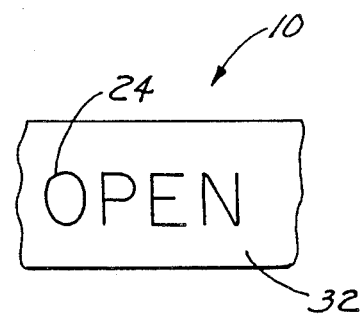
FIG. 2B is a top view of the tamper indicating tape of FIG. 2A with the film delaminated.

After tape 10 has been secured to first and the second container parts 26 and 28, any separation of the container parts will result in internal delamination of film 12 at a predetermined level of peel force, as shown in FIG. 1B. Upon delamination, the separated portions of the film become opaque due to surface irregularities in the exposed internal surfaces of the film created during the delamination of the film. First indicia 22 are no longer perceptible through second major surface 20 of the film. However, as shown in FIG. 2B, second indicia 24 are no longer obscured on the background of the first layer of adhesive, but are now readily perceptible against the white opaque background of the separated film portions. This provides an unambiguous indication of unauthorized access to the contents of the container. If desired, first indicia 22 may include alphanumeric characters forming a message indicative of a sealed condition for the container when tape 10 is applied. Second indicia 24 may also include alpha numeric characters forming a message that the container has been opened. Another feature of this invention is that the separated film portions will not readhere to each other once separated. This provides a further indication of unauthorized access to the interior of a container.

Figure 4:
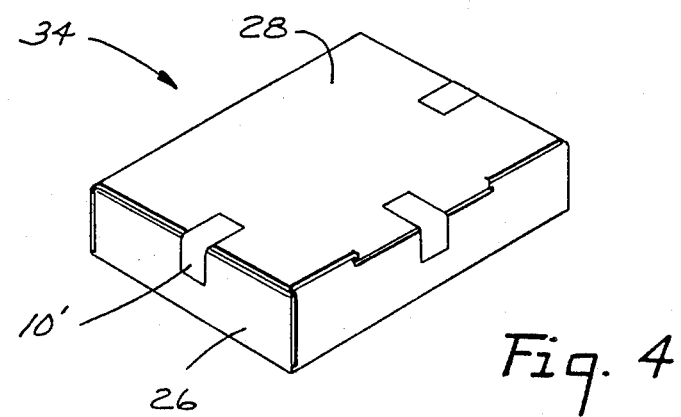
FIG. 4 is a perspective view of a rectangular container with tamper indicating tape according to this invention securing container parts together to enclose an opening in the container.

FIG. 4 illustrates an embodiment of this invention applied to box or like container 34. A length of the tamper indicating tape 10' with an adhesive layer applied only to the first major surface of the film is adhered to first and second container parts 26 and 28, such as the lid and side panel of the container. Opening the container requires destruction of the tape and thus provides an unambiguous indication of access to the interior of the container.

The following examples and test results are used to further illustrate this invention:

EXAMPLE 1

A blend of 75 pbw of a propylene/ethylene copolymer containing 2.7 pbw ethylene monomeric units of the copolymer (available from Fina Oil and Chemical Company, Houston, Tex.) and 25 parts by weight of an ethylene vinyl alcohol copolymer containing 44 mole percent ethylene and being essentially completely hydrolyzed (available from Eval Company of America, Lisle, Ill.) was fed into a ¾" Haake Extruder having a 25:1 4 L/D (length/diameter) ratio at a temperature of 430° F. and 1200 p.s.i. pressure. The extruder screw used had a 3:1 compression ratio and was run at 70 r.p.m. with the die orifice set a 15 mils. The molten film from the die was cast onto a chilled chrome roll at 50°–100° F. and at a speed of 25 feet per minute and drawn to form a 3 mil thick film. The film was then tested according to the test methods listed herein and the results are shown in Table I.

TABLE I

| TENSILE TESTING | | | |
| --- | --- | --- | --- |
| F-1 | F-3 | Breakstrength (lbs) | % elongation at break |
| 1.0 | 2.0 | 3.4 | 427 |

| DELAMINATION TEST | |
| --- | --- |
| Shiny Side | Matte Side |

TABLE I-continued

| (oz/in) | (oz/in) |
| --- | --- |
| 7.5 | 7.5 |

| LIGHT TRANSMITTANCE | |
| --- | --- |
| Before Delamination | |
| % transmittance (T$_2$) | % haze |
| 88.5 | 40.2 |
| After Delamination | |
| % transmittance (T$_2$) | % haze |
| 81.1 | 67.5 |

EXAMPLE 2-7

These were made in the same way as Example 1, except with different first olefinic copolymer and at different ratios of the copolymers (shown in Table II). The tests were also run in the same way as Example I and are shown in Table II.

TABLE II

| Example | 2 | 3 | 4 | 5 | 6 | 7 |
| --- | --- | --- | --- | --- | --- | --- |
| First Olefinic Copolymers | K123 | K222Z | K222Z | K222Z | K123 | PE |
| Ratios (First copolymer/ second copolymer) | 80/20 | 80/20 | 75/25 | 85/15 | 85/15 | 50/50 |
| Tensile Testing | | | | | | |
| F-1 | 1.1 | 2.5 | 2.5 | — | — | — |
| F-3 | 2.0 | 5.2 | 5.2 | — | — | — |
| Breakstrength (lbs) | 3.5 | 6.6 | 6.7 | — | — | — |
| % elongation | 420 | 250 | 240 | — | — | — |
| Delamination Test (oz./in) | | | | | | |
| Shiny side | 5.5 | 1.5 | 4.5 | 2.0 | 3.0 | >32.0 |
| Matte side | 7.5 | 1.8 | 3.5 | 8.0 | 11.3 | >16.0 |
| LIGHT TRANSMITTANCE | | | | | | |
| Before Delamination | | | | | | |
| % transmittance (T$_2$) | 88.1 | — | — | 77.6 | 80 | 81.6 |
| % Haze | 37.7 | — | — | 97.5 | 98 | 96 |
| After Delamination | | | | | | |
| % transmittance (T$_2$) | 80 | — | — | 81.4 | 84.6 | 84.1 |
| % Haze | 97.1 | — | — | 96.2 | 97.4 | 90.8 |

TEST METHODS

1. Delamination Test A 4" (10 cm) piece of Scotch Brand 600 tape was folded to itself with 0.5" overlap to form a tab. The tape was rolled at about 12"/minutes using a 4.5 pound roller onto a film constructed according to the present invention. An alligator clip was then attached to the tab and attached to the end of a 2 pound Ametek Force Gauge. The tab was pulled back at about 12"/minute at a 180° angle from the film. As the tab peeled off, the film delaminated and the reading on the dial was recorded.

2. Instron Tensile Tester This was tested according to ASTMD 3759-79. A specimen of the delaminating film of this invention, not more than 2" in width was clamped in the grips of an Instron Tensile Tester, taking care to align the long axis of the specimen with an imaginary line running between the points of attachment of the grips and including the center of the grips. No more tension was applied during clamping than was necessary to remove slack. The crosshead was set in motion at about 2"/minute and F-1, F-3, breakstrength, % elongation at break were recorded. (F-1 values are defined as force required to stretch the specimen 1%).

3. Light Transmittance Test A model Aux-10 Gardner Pivotable-Sphere Hazemeter was used for this test. The hazemter was first turned on and allowed to warm up for 15 minutes. Source "A" was selected for CIE illuminator. With no specimen in place and with light trap in the rear position, the digital read out was set to zero ($T_3$ value) using the zero adjustment. The pivot sphere was then moved forward and the digital read out was then set to 100.0 ($T_1$ value) using the calibrator control. A film specimen of about 1"×1" was then put in the specimen holder the % transmittance or optical clarity ($T_2$ value) was recorded. The sphere was pivoted backwards and a second reading ($T_4$ value) was also recorded. % haze was calculated from the following formula: $T_4/T_2 \times 100 = \%$ haze.

The present invention has now been described with reference to several embodiments thereof. It will be apparent to those skilled in the art that many changes can be made in the embodiments described without departing from the scope of the present invention. Thus, the scope of the present invention should not be limited to the structures described in this application, but only by structures described by the language of the claims and the equivalents of those structures.

We claim:

1. A light transmissive film derived from a composition comprising 50 to 85 parts per weight of a first copolymer comprising at least one moiety derived from at least one olefinic monomeric unit and 50 to 15 parts by weight of a second copolymer comprising at least one moiety derived from at least one vinyl alcohol monomeric unit and said second copolymer being sufficiently incompatible with said first copolymer to form two phases within said film, one of said phases being continuous.

2. The film of claim 1, wherein said first copolymer comprises at least 90 pbw propylene monomeric units.

3. The film of claim 2, wherein said first copolymer comprises about 97 pbw propylene monomeric units and from about 2.2 pbw to about 2.7 pbw ethylene monomeric units.

4. The film of claim 1, wherein said first copolymer further comprises from 0 to 15 pbw of monomeric units from a polar copolymerizable monomer substantially free of hydroxy (—OH) groups.

5. The film of claim 1, wherein said first copolymer further comprises from 0 to 15 parts by weight of a polar copolymerizable monomer substantially free of hydroxy, (—OH) groups selected from the group consisting of acryl acid, acrylonitrile, bicyclo hept-2-ene, bis (β-chloroethyl) vinylphosphonate, carbon monoxide, diethyl fumarate, diethyl maleate, ethyl acrylate, methacrylic acid N-methyl-N-vinylacetamide, styrene, vinyl acetate, vinyl chloride, and vinyl fluoride.

6. The film of claim 1, wherein said first copolymer further comprises from 0 to 15 pbw of monomeric units from a polar copolymerizable monomer substantially free of hydroxy (—OH) groups selected from the group consisting of acrylic acid, methacrylic acid and vinyl acetate.

7. The film of claim 1, wherein said second copolymer is a copolymer containing monomeric units of hydrolyzed ethylene vinyl acetate.

8. The film of claim 7, wherein said second copolymer is ethylene vinyl alcohol.

9. A tamper indicating tape for securing a first container part to a second container part to enclose an opening in the container, comprising:
 (a) a light transmissive film according to claim 1 having a first major surface and an opposing second major surface;
 (b) first colored indicia printed on said first major surface of said film;
 (c) second colored indicia printed on said second major surface of said film, said first and second indicia having contrasting colors; and
 (d) means for adhering said film to the first and the second container parts with a bond strength greater than the delamination force of said film, said adhesive means being coated on said first major surface of said film opposite said second indicia having color substantially identical with said second indicia, whereby said second indicia are obscured when viewed against said adhesive means through said second major surface of said film;
 (e) whereby when said film delaminates, the film becomes opaque so that said first indicia are obscured when viewed through said delaminated opaque film, but said second indicia are perceptible over said delaminated opaque film to indicate separation of the container parts.

10. The tamper indicating tape of claim 9, wherein said adhesive means includes:
 (a) a first layer of adhesive coated on said first major surface of said film opposite said second indicia for adhering said film to the first container part, said first layer of adhesive having a color substantially identical to said second indicia whereby said second indicia are obscured by said first layer of adhesive when viewed through said second major surface of said film; and
 (b) a second layer of adhesive coated on said second major surface of said film for adhering said film to the second container part, said second layer of adhesive being colorless and light transmissive so that said first indicia are visible through said film and said second layer of adhesive;
 (c) whereby when the first and the second container parts are separated, said film delaminates with said first layer of adhesive and a portion of said delaminated film remaining on the first container part, and said second layer of adhesive and the remaining portion of said delaminated film remaining on the second container part, and said delaminated film becomes opaque so that said first indicia are obscured when viewed through said delaminated film, but said second indicia are perceptible on said delaminated opacified film to indicate separation of the container parts.

11. The tamper indicating tape of claim 9, wherein said first copolymer comprises at least 90 pbw propylene monomeric moeities.

12. The tamper indicating tape of claim 11, wherein said first copolymer comprises about 97 pbw propylene monomeric moeities and from about 2.2 pbw to about 2.7 pbw ethylene monomeric moeities.

13. The tamper indicating tape of claim 9, wherein said first copolymer further comprises from 0 to 15 parts by weight of a polar copolymerizable monomer substantially free of hydroxy (—OH) groups.

14. The tamper indicating tape of claim 9, wherein said first copolymer further comprises from 0 to 15 parts by weight of a polar copolymerizable monomer substantially free of hydroxy (—OH) groups selected from the group consisting of acrylic acid, acrylonitrile, bicyclo hept-2-ene, bis (β-chloroethyl) vinylphosphonate, carbon monoxide, diethyl fumarate, diethyl maleate, ethyl acrylate, methacrylic acid, N-methyl-N-vinylacetamide, styrene, vinyl acetate, vinyl chloride, and vinyl fluoride.

15. The tamper indicating tape of claim 9, wherein said first copolymer further comprises from 0 to 15 parts by weight of a polar copolymerizable monomer substantially free of hydroxy (—OH) groups selected from the group consisting of acrylic acid, methacrylic acid and vinyl acetate.

16. The tamper indicating tape of claim 9, wherein said second copolymer is a copolymer of hydrolyzed ethylene vinyl acetate.

17. The tamper indicating tape of claim 16, wherein said second copolymer is ethylene vinyl alcohol.

18. The tamper indicating tape of claim 9, wherein said adhesive means includes a pressure sensitive adhesive layer coated on at least one major surface of said film.

19. In combination:
(a) a container having a first container part and a second container part for enclosing an opening in said container when secured together; and
(b) tamper indicating tape for adhesively securing said first and said second container parts together to enclose said opening in said container, including a light transmissive film having a first major surface and an opposing second major surface, said film derived from a composition comprising 50 to 85 parts by weight of a first copolymer comprising at least one moeity derived from at least one olefinic monomer and 50 to 15 parts by weight of a second copolymer comprising at least one moeity derived from at least one vinyl alcohol monomer and said second copolymer being sufficiently incompatible with said first copolymer to form two phases within said film, one of said phases being continuous,
first colored indicia printed on said first major surface of said film,
second colored indicia printed on said second major surface of said film, said first and second indicia having contrasting colors, and
adhesive means for adhering said film to said first and said second container parts with a bond strength greater than the delamination force of said film, said adhesive means being coated on said first major surface of said film opposite said second indicia having a color substantially identical with said second indicia whereby said second indicia are obscured when viewed against said adhesive means through said second major surface of said film;
(c) whereby when said film is delaminated, said film becomes opaque so that said first indicia are obscured when viewed through said delaminated film, but said second indicia are perceptible over said delaminated opaque film to indicate separation of said container parts.

* * * * *

UNITED STATES PATENT AND TRADEMARK OFFICE
CERTIFICATE OF CORRECTION

PATENT NO. : 4,876,123
DATED : OCTOBER 24, 1989
INVENTOR(S) : RAYMOND R. RIVERA ET AL.

It is certified that error appears in the above-identified patent and that said Letters Patent is hereby corrected as shown below:

Col. 4, line 44, "colord" should be --colored--.
Col. 7, line 5, "hazemter" should be --hazemeter--.
Col. 7, line 40, "propylene" should be --olefinic--.
Col. 7, line 40, After "units" insert --having between 2 and 4 carbon atoms--.
Col. 7, line 53, "acryl" should be --acrylic--.
Col. 7, line 56, "acid" should be --acid,--.
Col. 8, line 57-58, "propylene" should be --olefinic--.
Col. 8, line 58, After "moeities" insert --having between 2 and 4 carbon atoms--.
Col. 9, line 4, After "bicyclo" insert --[2,2,1]--.

Signed and Sealed this

Twenty-seventh Day of August, 1991

Attest:

HARRY F. MANBECK, JR.

Attesting Officer

Commissioner of Patents and Trademarks